(12) United States Patent
Kim et al.

(10) Patent No.: US 10,912,367 B2
(45) Date of Patent: Feb. 9, 2021

(54) MOBILE PHONE CASE HAVING MAKE-UP PALETTES CAPABLE OF BEING SEPARATED AND COMBINED

(71) Applicant: ONE DAY ONE COMMUNICATION, Seoul (KR)

(72) Inventors: Chang-Hee Kim, Seoul (KR); Se-Ri Sun, Seongnam-si (KR)

(73) Assignee: ONE DAY ONE COMMUNICATION, Seoul (KR)

( * ) Notice: Subject to any disclaimer, the term of this patent is extended or adjusted under 35 U.S.C. 154(b) by 396 days.

(21) Appl. No.: 15/777,823

(22) PCT Filed: Nov. 7, 2016

(86) PCT No.: PCT/KR2016/012721
§ 371 (c)(1),
(2) Date: May 21, 2018

(87) PCT Pub. No.: WO2017/090914
PCT Pub. Date: Jun. 1, 2017

(65) Prior Publication Data
US 2018/0344004 A1 Dec. 6, 2018

(30) Foreign Application Priority Data
Nov. 24, 2015 (KR) .......................... 10-2015-0164809

(51) Int. Cl.
*H04M 1/00* (2006.01)
*A45D 33/26* (2006.01)
(Continued)

(52) U.S. Cl.
CPC ............. *A45D 33/26* (2013.01); *A45C 11/00* (2013.01); *A45C 13/1069* (2013.01);
(Continued)

(58) Field of Classification Search
CPC ...... A45D 40/24; A45D 33/008; A45D 33/26; A45D 40/22; A45C 13/005; A45C 11/00;
(Continued)

(56) References Cited

U.S. PATENT DOCUMENTS 4,421,127 A * 12/1983 Geer .................... A45D 33/006
132/294
8,602,039 B1 * 12/2013 Gindi .................. H04M 1/0247
132/315
(Continued)

FOREIGN PATENT DOCUMENTS

KR 10-2009-0014092 A 2/2009
KR 10-1216854 B1 12/2012
(Continued)

*Primary Examiner* — Nhan T Le
(74) *Attorney, Agent, or Firm* — Novick, Kim & Lee, PLLC; Jae Yoon Kim (57) ABSTRACT

The present invention relates to a mobile phone case and, more specifically, to a mobile phone case having make-up palettes capable of being separated and combined, in which the mobile phone case is provided, on the rear surface thereof, with a cosmetics storage recess for storing a plurality of make-up palettes capable of being combined in various ways, which enables a user to: select and combine different colored make-up palettes according to a user selection, thereby solving an inconvenience to separately carry various types of cosmetics and make-up kits; freely configure make-up palettes to reflect the user's individuality and preference; and change only a necessary module, which is rational and economical in that the user does not need to newly purchase all make-up palettes in order to use one type of cosmetics.

9 Claims, 8 Drawing Sheets

(51) Int. Cl.
*B65D 43/22* (2006.01)
*A45C 11/00* (2006.01)
*B65D 85/30* (2006.01)
*B65D 51/24* (2006.01)
*B65D 77/04* (2006.01)
*A45C 13/10* (2006.01)
*A45D 40/24* (2006.01)
*H04M 1/21* (2006.01)
*A45D 33/00* (2006.01)
*H04B 1/3888* (2015.01)
*A45F 5/00* (2006.01)

(52) U.S. Cl.
CPC ........... *A45D 33/008* (2013.01); *A45D 40/24* (2013.01); *B65D 43/22* (2013.01); *B65D 51/24* (2013.01); *B65D 77/04* (2013.01); *B65D 85/30* (2013.01); *H04B 1/3888* (2013.01); *H04M 1/21* (2013.01); *A45C 11/008* (2013.01); *A45C 2011/002* (2013.01); *A45F 2005/002* (2013.01); *A45F 2200/0516* (2013.01)

(58) Field of Classification Search
CPC .......... A45C 13/1069; A45C 2011/002; H04B 1/3888; B65D 43/22; B65D 51/24; B65D 77/04; B65D 85/30; H04M 1/04; H04M 1/21

See application file for complete search history.

(56) References Cited

U.S. PATENT DOCUMENTS

| | | | |
|---|---|---|---|
| 8,978,886 B2* | 3/2015 | Ziemba | A45C 11/182 206/320 |
| 2007/0075208 A1* | 4/2007 | Chen | F16M 11/10 248/455 |
| 2013/0267282 A1* | 10/2013 | Shin | H04B 1/3838 455/575.1 |
| 2014/0089196 A1* | 3/2014 | Paya | G06F 21/31 705/44 |
| 2017/0055064 A1* | 2/2017 | Yoo | H04R 1/26 |

FOREIGN PATENT DOCUMENTS

| | | |
|---|---|---|
| KR | 10-2013-0127278 A | 11/2013 |
| KR | 10-1344048 B1 | 12/2013 |
| KR | 20-2014-0002944 U | 5/2014 |
| KR | 20-0474872 A | 10/2014 |
| KR | 20-0477076 Y1 | 5/2015 |

* cited by examiner

MOBILE PHONE CASE HAVING MAKE-UP PALETTES CAPABLE OF BEING SEPARATED AND COMBINED

TECHNICAL FIELD

The present invention relates to a mobile phone case and, more specifically, to a mobile phone case having make-up palettes capable of being separated and combined, in which the mobile phone case is provided, on the rear surface thereof, with a cosmetics storage recess for storing a plurality of make-up palettes capable of being combined in various ways, which enables a user to: select and combine different colored make-up palettes according to a user selection, thereby solving an inconvenience to separately carry various types of cosmetics and make-up kits; freely configure make-up palettes to reflect the user's individuality and preference; and change only a necessary module, which is rational and economical in that the user does not need to newly purchase all make-up palettes in order to use one type of cosmetics.

BACKGROUND ART

A mobile phone refers to a telecommunication terminal that a user may easily use with hands while holding, and the reality is that most of people carry a mobile phone as a necessity in modern times.

Such mobile phone has many additional functions like DMB (Digital Multimedia Broadcasting), navigation, camera, MP3 (MPEG Audio Layer-3), which is a digital sound source, multi media player, which is playing digital videos, etc., and functions as more digital devices by means of an application program, so called, APP (application).

As for smartphones, recently released, not only wireless internet access becomes available throughout broadband and WiFi (wireless fidelity), but more additional functions are added. Also, its design or shape has become beautiful.

Further, most of smartphones, currently being sold in Korea, are designed to be bar type phones in which a screen-showing front is comprised of a touch screen. The front touch screen is of tempered glass.

The tempered glass is strongly resistant to scratch and front impact, but extremely vulnerable to side impact. In case that a user handles a smartphone made of tempered glass display panel and drops the smartphone by mistake, a front panel protecting the display panel, or the display panel itself is broken due to ground shock.

Thus, users try to protect mobile phones by using a mobile phone protection case in order to prevent scratch, cracks, or damage which may happen to their mobile phones, relatively expensive and beautiful, and various types of mobile phone protection cases have been being sold according to preferences.

Such mobile phone protection cases are manufactured in different shapes like diary type, flip type, bumper type, view type, jelly type, etc.

Meanwhile, as for women using their mobile phones, they have to carry mobile phones and cosmetics separately in a bag and thus, the volume of the bag becomes large. Also, they always have to carry a bag in which cosmetic case for make-up is contained, thereby causing inconvenience.

To solve such problems, mobile phone cases in which cosmetics are contained were developed as shown in Korean Utility Model Registration no. 20-0474066 (Phone having cosmetics) and Korean Patent Publication no. 10-2009-0014092 (Mobile phone having means for containing cosmetics).

The phone having cosmetics is comprised of a cosmetic case having several storage recesses; cosmetics contained in the storage recesses of the cosmetic case; a guiding part for being extended and installed at a certain height along the upper side of the cosmetic case so as to make a main body slide up and down; and a main body for communicating as well as being injected to the guiding part and sliding up and down so as to open and close the cosmetic case.

Further, the mobile phone having means for containing cosmetics consists of a means for storing cosmetics in a main body of the mobile phone, wherein the means for storing cosmetics may be configured to be combined to the main body, or separated from the main body; and a refill container for refilling cosmetics in case of combination with the main body.

However, in such conventional mobile phone case with cosmetics, cosmetics are filled into recesses in the case and thus, it is impossible to be changed separately. Also, same colors are provided all the time and thus, it needs to carry cosmetics separately when applying makeup with different colors.

Furthermore, lights are not configured in such conventional mobile phone case with cosmetics.

PRIOR ART

Reference (Patent document 1) Korean Utility Model Registration No. 20-0474066
(Patent document 2) Korean Patent Publication No. 10-2009-0014092

DISCLOSURE

Technical Problem

For solving above problems, the object of the present invention is to provide a mobile phone case having make-up palettes capable of being separated and combined, in which the mobile phone case is provided, on the rear surface thereof, with a cosmetics storage recess for storing a plurality of make-up palettes capable of being combined in various ways, which enables a user to: select and combine different colored make-up palettes according to a user selection, thereby solving an inconvenience to separately carry various types of cosmetics and make-up kits; freely configure make-up palettes to reflect the user's individuality and preference; and change only a necessary module, which is rational and economical in that the user does not need to newly purchase all make-up palettes in order to use one type of cosmetics.

Further, the another object of the present invention is to provide a mobile phone case having make-up palettes capable of being separated and combined, in which an NFC module adheres to the rear surface of a mirror and a light-emitting member illuminated by the NFC module is provided on the edge of the mirror so as to illuminate the light-emitting member by means of frequency signals, received by APP in a smartphone, while forming a rotating cover in a cosmetic storage recess and sticking the mirror to the inside of the cover, which enables to apply or correct makeup easily even in a dark place using the mirror.

Technical Solution

To accomplish above objects, the present invention comprises a palettes storage recess for being formed in a rectangular shape to the rear surface center of a main body; make-up palettes for being formed in a square or rectangular shape and arranged in several palettes to the palettes storage recess by filling the inside with color cosmetics; and a cover for being formed in a plate shape whose size is the same as the main body and being axially combined for rotation at one side of the rear surface of the main body, wherein a mobile phone case is provided, on the front edge of the main body, with a raised spot for storing a mobile phone.

Here, the mobile phone case is equipped with one or more of supplementary palettes storage recesses at both sides of the palettes storage recess based on the size of the mobile phone and stores supplementary make-up palettes to the supplementary palettes storage recesses by fitting the size.

Here, the palettes storage recess or the supplementary palettes storage recess forms a first magnetic plate at the inner bottom, and the make-up palettes or the supplementary make-up palettes form a second magnetic plate at the bottom, thereby attached to the palettes storage recess or the supplementary palettes storage recess.

Here, the palettes storage recess or the supplementary palettes storage recess forms one or more of first clamping recesses at the inner bottom, and fastening protrusions project out over the make-up palettes or the supplementary make-up palettes so as to be coupled to the first clamping recesses in the palettes storage recess or the supplementary palettes storage recess at the bottom.

Here, the palettes storage recess comprises an opening whose the front surface or rear surface is open, a first sliding protrusion on the left or right side edge, and a first sliding recess on the right or left side edge; and the make-up palettes comprise a second sliding recess on one side so as to connect the first sliding protrusion of the palettes storage recess or the neighboring make-up palettes, and a second sliding protrusion on the other side so as to connect the second sliding recess of the palettes storage recess or the neighboring make-up palettes.

Here, the palettes storage recess includes a fixing bar which is combined to a hinge so at to make one end rotate for injecting and fixing the make-up palettes to the opening.

Here, the cover includes a mirror recess at the inner side, and a mirror sticks to the mirror recess.

Here, the mirror sticks to an NFC(Near Field Communication) module on the rear surface; and a light-emitting member which is illuminated by frequency of the NFC module on the rear surface edge while making the edge transparent.

Here, wherein the NFC module is operated by APP installed to the mobile phone.

Here, the cover installs a first fixing magnet at one side of the bottom; and a second fixing magnet is installed to a position corresponding to the first fixing magnet of the cover on the rear surface of the main body, thereby fixing the cover to the main body.

Here, a second fastening protrusion projects out over one side of the bottom of the cover; and a second clamping recess is installed to a position corresponding to the second fastening protrusion of the cover on the rear surface of the main body, thereby fixing the cover to the main body throughout integral combination.

Advantageous Effects

According to the mobile phone case having make-up palettes capable of being separated and combined of the present invention, as constituted above, the mobile phone case is provided, on the rear surface thereof, with a cosmetics storage recess for storing a plurality of make-up palettes capable of being combined in various ways, which enables a user to: select and combine different colored make-up palettes according to a user selection, thereby solving an inconvenience to separately carry various types of cosmetics and make-up kits; freely configure make-up palettes to reflect the user's individuality and preference; and change only a necessary module, which is rational and economical in that the user does not need to newly purchase all make-up palettes in order to use one type of cosmetics.

Further, according to the present invention, an NFC module adheres to the rear surface of a mirror and a light-emitting member illuminated by the NFC module is provided on the edge of the mirror so as to illuminate the light-emitting member by means of frequency signals, received by APP in a smartphone, while forming a rotating cover in a cosmetic storage recess and sticking the mirror to the inside of the cover, which enables to apply or correct makeup easily even in a dark place using the mirror.

DESCRIPTION OF THE PREFERRED EMBODIMENTS

The configuration of a mobile phone case having make-up palettes capable of being separated and combined of the present invention will be described in detail with the accompanying drawings.

In the following description of the present invention, a detailed description of known incorporated functions and configurations will be omitted when to include them would make the subject matter of the present invention rather unclear. Also, the terms used in the following description are defined taking into consideration the functions provided in the present invention. The definitions of these terms should be determined based on the whole content of this specification, because they may be changed in accordance with the option of a user or operator or a usual practice.

Figure 1:
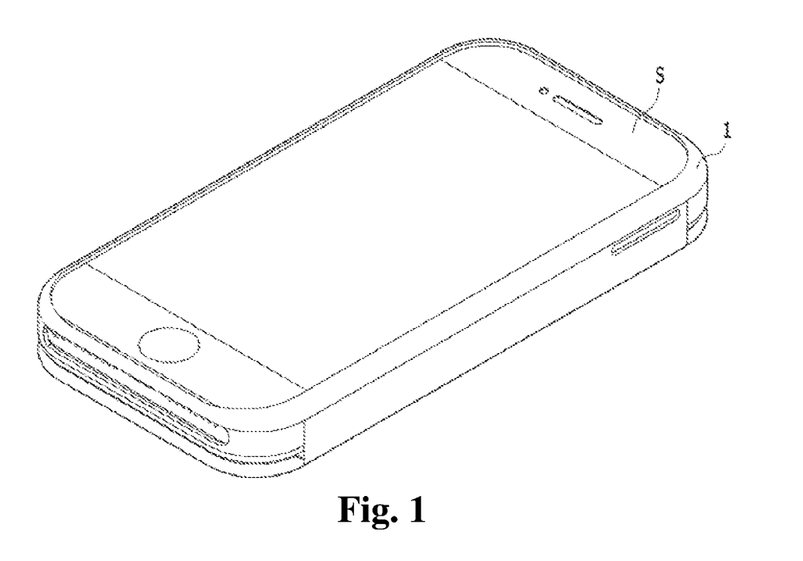
FIG. 1 illustrates a front perspective view showing the constitution of the mobile phone case having make-up palettes capable of being separated and combined according to the present invention.
Figure 2:
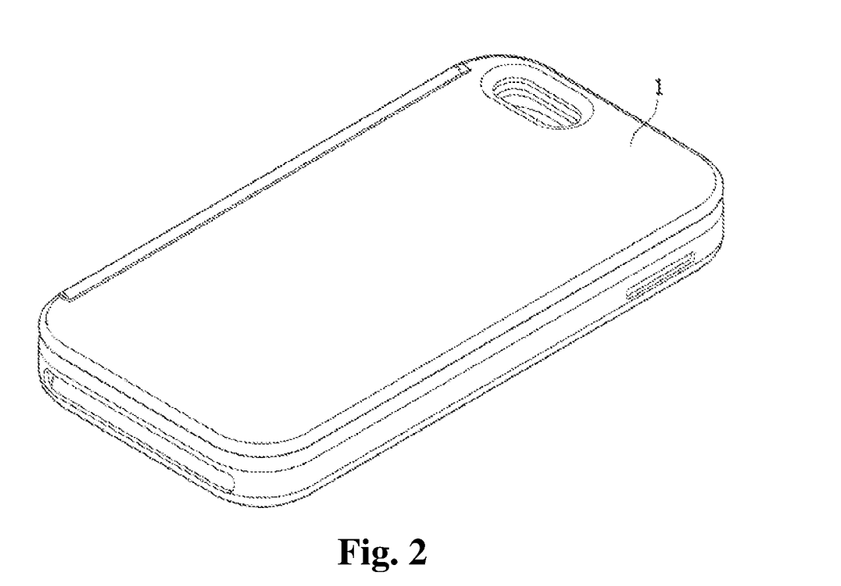
FIGS. 2 & 3 illustrate rear perspective views showing the constitution of the mobile phone case having make-up palettes capable of being separated and combined according to the present invention.
Figure 3:
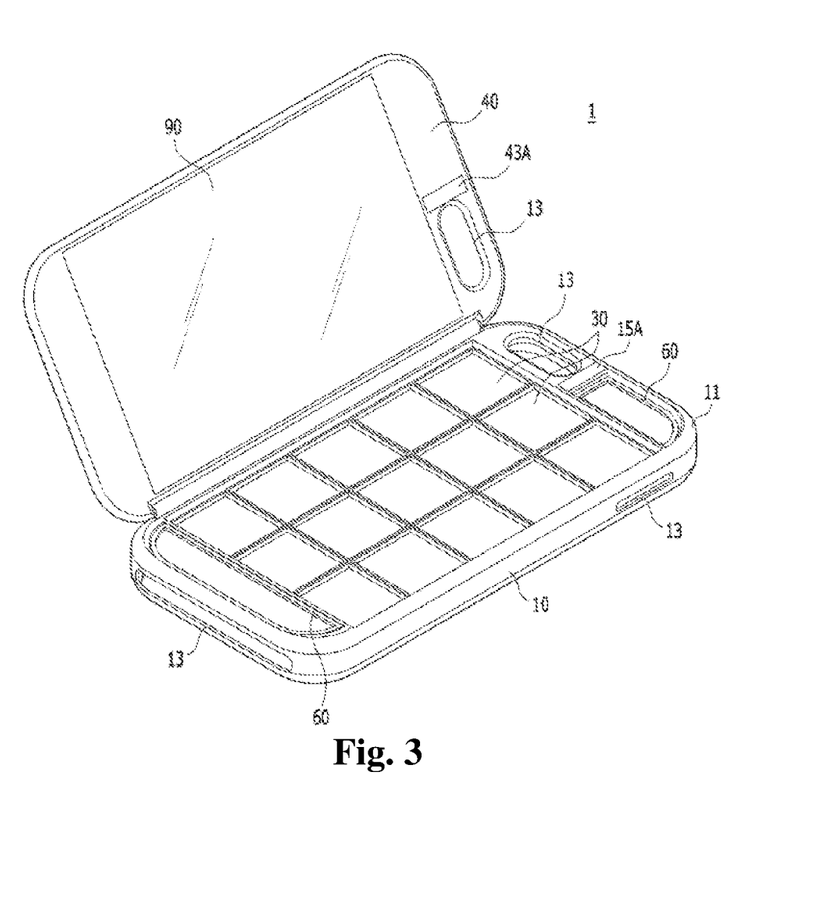
Figure 4:
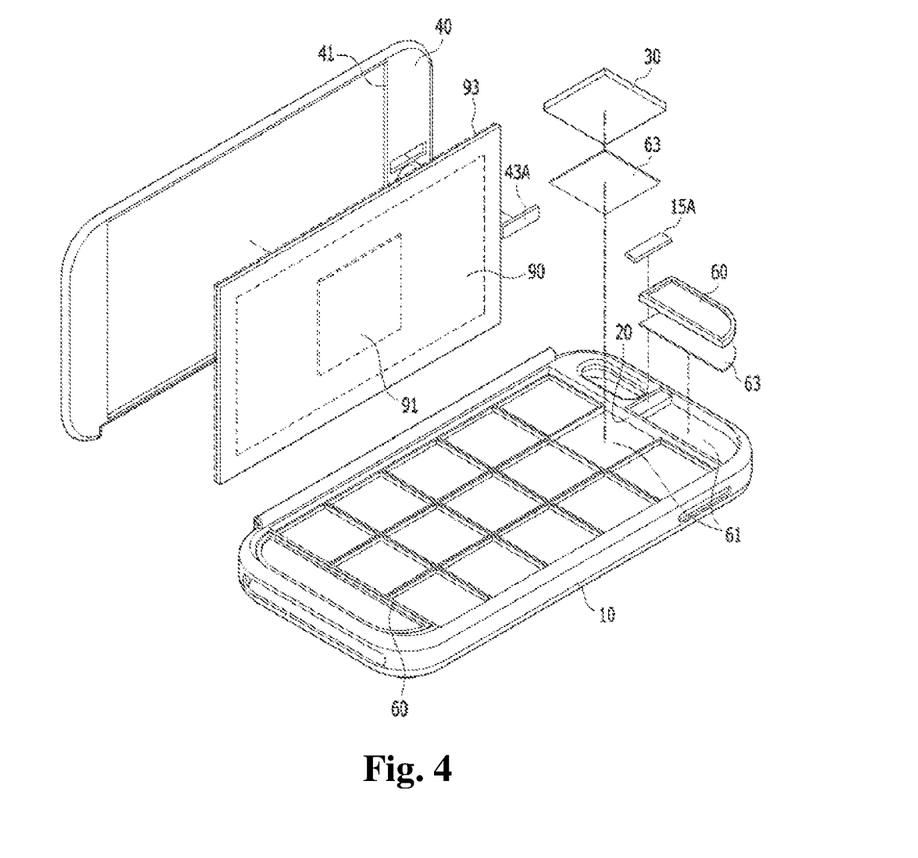
FIG. 4 illustrates an exploded perspective view of FIG. 2.
Figure 5:
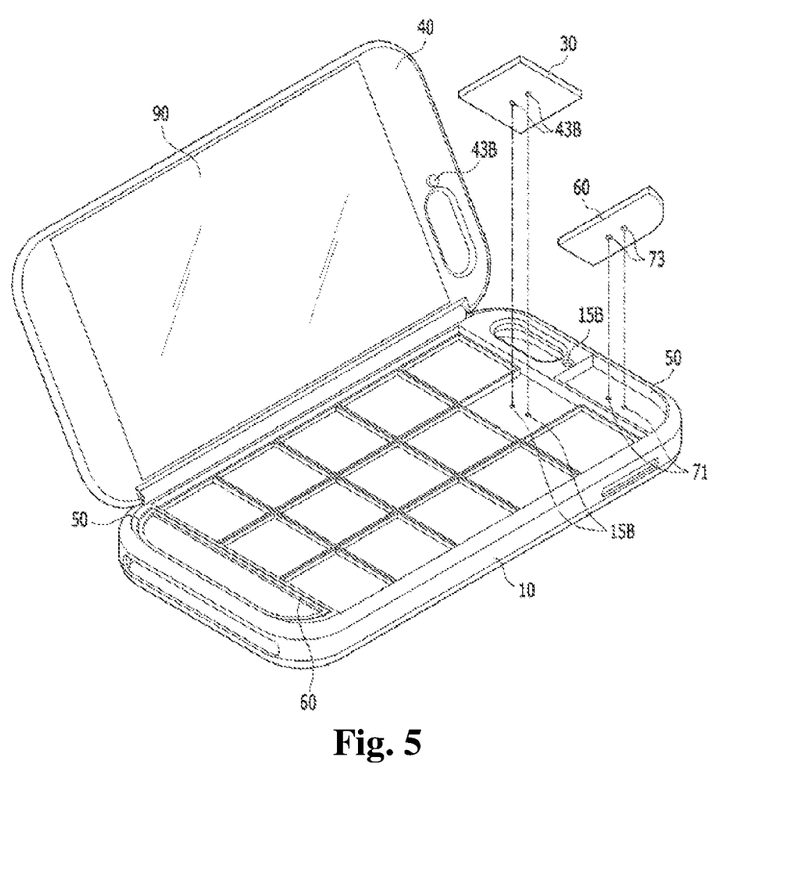
FIGS. 5 & 6 illustrate rear perspective views showing the constitution of the mobile phone case having make-up palettes capable of being separated and combined according to another embodiment of the present invention.
Figure 6:
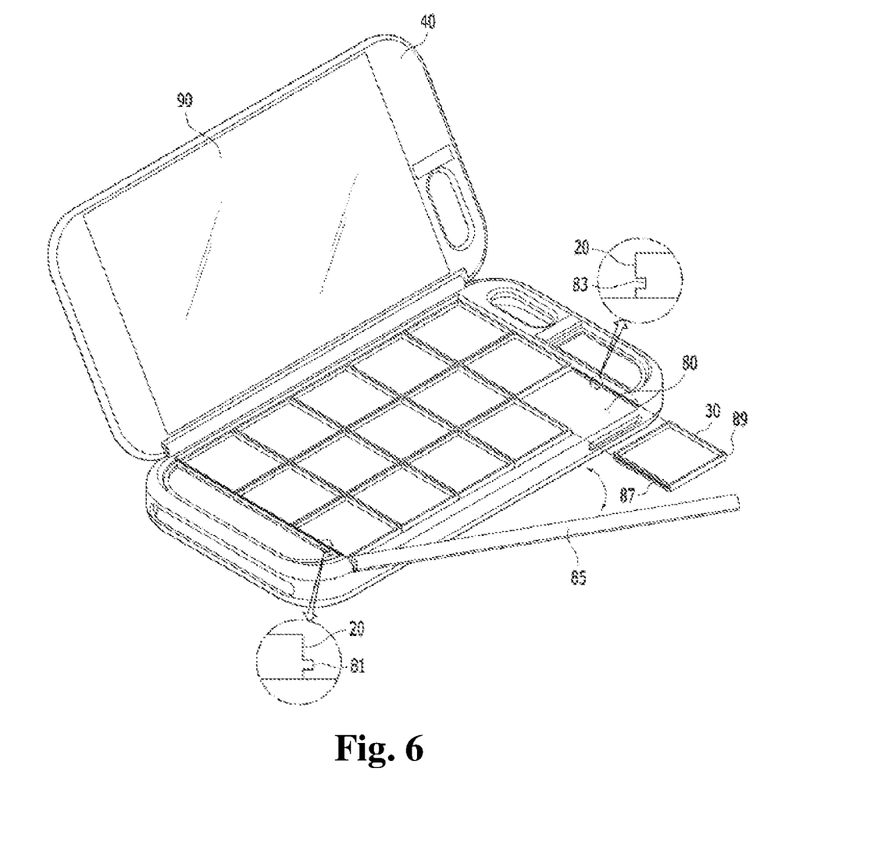
Figure 7:
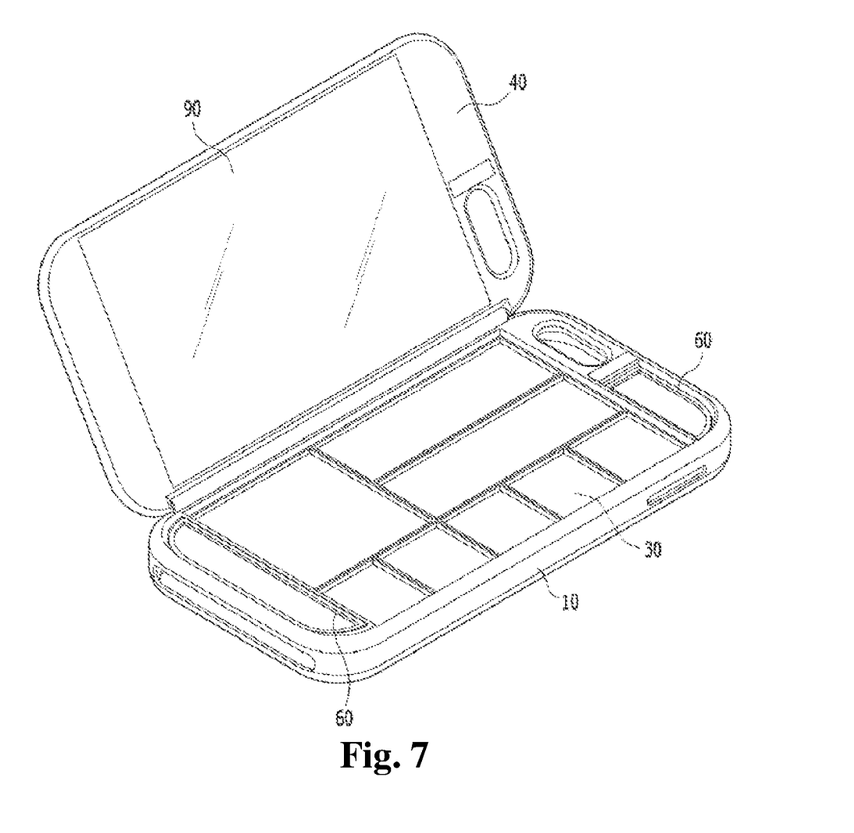
FIGS. 7 to 9 illustrate use state diagrams showing the use state of the mobile phone case having make-up palettes capable of being separated and combined according to another embodiment of the present invention.
Figure 8:
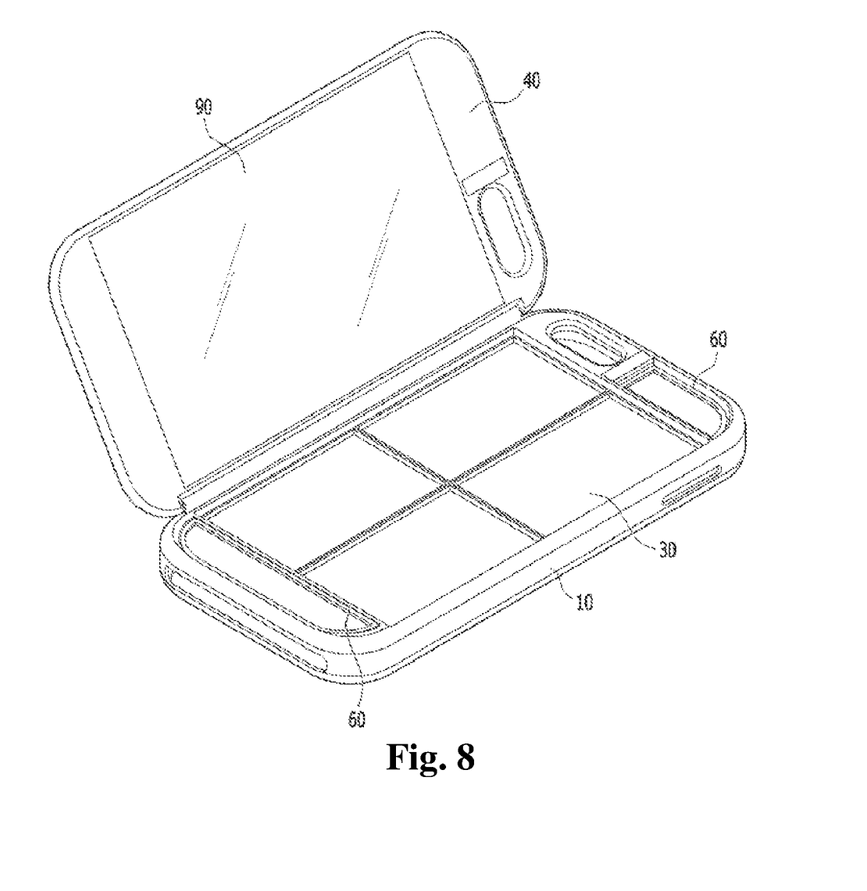
Figure 9:
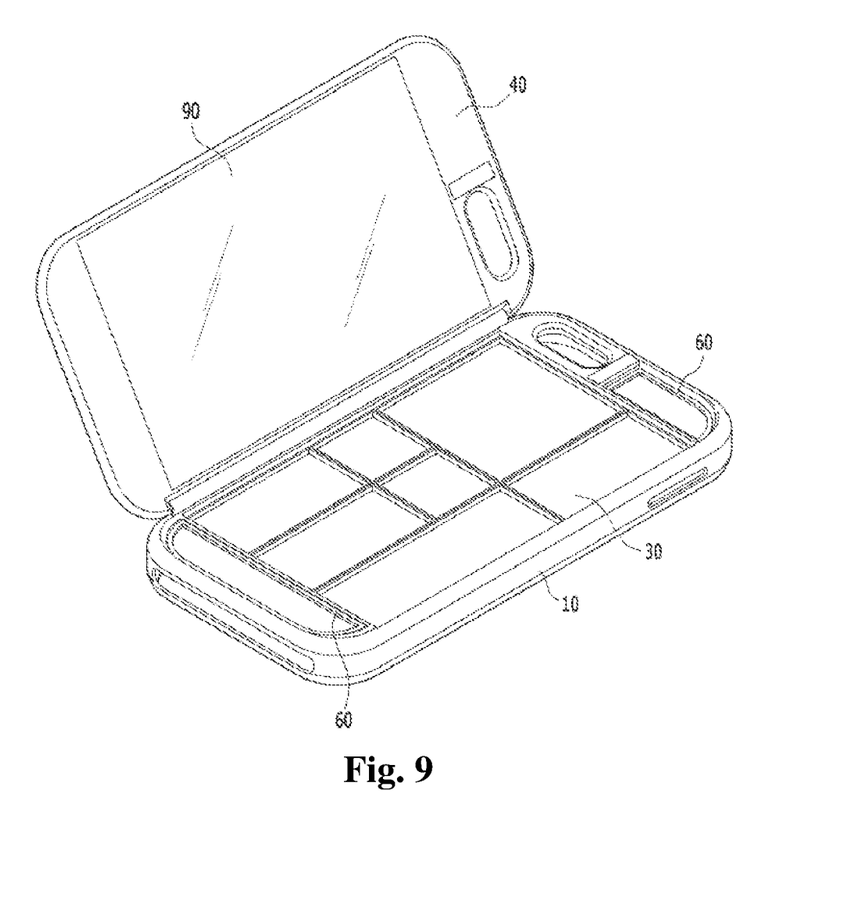

FIG. 1 illustrates a front perspective view showing the constitution of the mobile phone case having make-up palettes capable of being separated and combined according to the present invention; FIGS. 2 & 3 illustrate rear perspective views showing the constitution of the mobile phone case having make-up palettes capable of being separated and combined according to the present invention; FIG. 4 illustrates an exploded perspective view of FIG. 2.; FIG. 4 illustrates a regular sectional view of FIG. 1.; FIGS. 5 & 6 illustrate rear perspective views showing the constitution of the mobile phone case having make-up palettes capable of being separated and combined according to another embodiment of the present invention; and FIGS. 7 to 9 illustrate use state diagrams showing the use state of the mobile phone case having make-up palettes capable of being separated and combined according to another embodiment of the present invention.

Referring to FIGS. 1 to 9, a mobile phone case having make-up palettes capable of being separated and combined (1) according to the present invention comprises a main body (10), a palettes storage recess (20), make-up palettes (30) and a cover (40).

First, the main body (10), synthetic resin or metallic, is provided, on the front edge, with a raised spot (11) for storing a mobile phone. At this time, the main body (10) may form a plurality of holes (13) such as a camera, a microphone, earphones, a button, flash, etc., for corresponding to the mobile phone(S) and include a flip cover (not illustrated) in front depending on choices.

Further, integrated with the main body (10), the palettes storage recess (20) is formed in a rectangular shape to the rear surface center of the main body (10). At this time, regardless of the size of the mobile phone, the palettes storage recess (20) has same size rectangle (for example, 15 cm×5 cm in width and length) for generality.

Hereinafter, the palettes storage recess (20) includes a first magnetic plate (61) at the inner bottom as illustrated in FIG. 4, or one or more of first clamping recesses (71) at the inner bottom as illustrated in FIG. 5, or an opening (80) whose the front surface or rear surface is open, a first sliding protrusion (81) on the left or right side edge, and a first sliding recess (83) on the right or left side edge as illustrated in FIG. 6. Here, it is desirable that the palettes storage recess (20) as shown in FIG. 6 includes a fixing bar (85) which is combined to a hinge so at to make one end rotate for injecting and fixing the make-up palettes (30) to the opening (80) and is locked and unlocked to the main body (10). Further, the fixing bar (85) may be hollow so as to store make-up brush (not illustrated) inside.

Further, the make-up palettes (30), synthetic resin or metallic, are formed in a square or rectangular shape and arranged in several palettes to the palettes storage recess (20) by filling the inside with color cosmetics. Here, the make-up palettes (30) may be in 5×3 arrangement, which is basic, in the palettes storage recess (20) as illustrated in FIG. 3, or manufactured in different sizes, arranged like a puzzle, and utilized with any one of make-up palettes for brush storage as illustrated in FIGS. 7 to 9.

Hereinafter, the make-up palettes (30) may form a second magnetic plate (63) at the bottom so as to integrally stick to a first magnetic plate (61) of the palettes storage recess (20) as illustrated in FIG. 4; or a first fastening protrusion (73) may project out at the bottom so as to couple to first clamping recesses (71) of the palettes storage recess (20) as illustrated in FIG. 5; or a second sliding recess (87) may be formed so as to couple to the first sliding protrusion (81) of the palettes storage recess (20) or a second sliding protrusion (89) of the neighboring make-up palettes (30) on one side, and the second sliding protrusion (89) may be formed so as to couple to the first sliding recess (83) of the palettes storage recess (20) or the second sliding recess (87) of the neighboring make-up palettes (30) on the other side as illustrated in FIG. 6. Here, the locations of the first fastening protrusion (73) and the first clamping recesses (71) may be integrally changed, and the number may be varied according to selection.

Further, the cover (40), synthetic resin or metallic, is formed in a plate shape, whose size is the same as the main body (10), and is axially combined for rotation at one side of the rear surface of the main body (10). Here, the cover (40) may form a recess (not illustrated) at the inner side so as to store makeup brushes (not illustrated).

Hereinafter, the cover (40) includes a mirror recess (41) at the inner side, and a mirror sticks to the mirror recess (41). As illustrated in FIG. 4, the mirror (90) sticks to an NFC (Near Field Communication) module (91) on the rear surface; and a light-emitting member (93) which is illuminated by frequency of the NFC module (91) on the rear surface edge while making the edge transparent, wherein the NFC module (91) is operated by APP installed to the mobile phone(S). Here, the configurations of the NFC module (91) and the light-emitting member (93) are published in Korean Registration Patent nos. 10-1216854, 10-1344048, etc. In case that the NFC module (91) and the mobile phone(S) are not in the detection range, it may be possible to install the NFC module (91) to the palettes storage recess (20) and connect the light-emitting member (93), located to the mirror (90), electronically by using a flexible film, etc., in which a circuit board is printed. Further, while making the edge of the mirror (90) transparent, various shapes of holes like a circle, a square, a star, etc., are made to the transparent parts and thus, light beams through the holes so as to increase aesthetic impression.

Hereinafter, as illustrated in FIG. 4, a first fixing magnet (43A) may be installed at one side of the bottom of the cover (40), and a second fixing magnet (or metal)(15A) may be equipped with a position corresponding to the first fixing magnet (or metal)(43A) of the cover (40) on the rear surface of the main body (10), thereby fixing the cover (40) to the main body (10); or as illustrated in FIG. 5, a second fastening protrusion (43B) may project out over one side of the bottom, and a second clamping recess (15B) may be installed to a position corresponding to the second fastening protrusion (43B) of the cover (40) on the rear surface of the main body (10), thereby fixing the cover (40) to the main body (10) throughout integral combination. Here, the locations of the second fastening protrusion (43B) and the second clamping recess (15B) may be integrally changed, and the number may be varied according to selection.

Meanwhile, the mobile phone case having make-up palettes capable of being separated and combined (1) according to the present invention is equipped with one or more of supplementary palettes storage recesses (50) at both sides of the palettes storage recess (20) based on the size of the mobile phone(S) and stores supplementary make-up palettes (60) to the supplementary palettes storage recesses (50) by fitting the size.

Hereinafter, the supplementary palettes storage recess (50) may form the first magnetic plate (61) at the inner bottom; the supplementary make-up palettes (60) may form the second magnetic plate (63) at the bottom so as to be attached to the supplementary palettes storage recesses (50), or may form one or more of the first clamping recesses (71) at the inner bottom; and the first fastening protrusion (73) may project out so as to be coupled to the first clamping recesses (71) in the supplementary palettes storage recess (50) at the bottom of the supplementary make-up palettes (60). Here, the locations of the first fastening protrusion (73) and the first clamping recesses (71) may be integrally changed.

Hereinafter, the operation of the mobile phone case having make-up palettes capable of being separated and combined according to the embodiments of the present invention will be described in detail with reference to the accompanying drawings.

First, a user stores and fixes the mobile phone(S) in front with the raised spot (11) of the main body (10).

Then, the user opens the cover (40) and injects the make-up palettes (30), which contain a preferred design, to the palettes storage recess (20).

Similarly, after storing the supplementary make-up palettes (60) to supplementary palettes storage recesses (50), the user carries the mobile phone in which the cover (40) is closed.

In this condition, when applying or correcting makeup, the user opens the cover (40) and uses makeup brush or compact with color makeup, filled in the make-up palettes (30) or the supplementary make-up palettes (60).

Meanwhile, when there is no light, the user transfers frequency with the NFC module (91), attached to the mirror (90), by using APP installed to the mobile phone(S), that is, smartphone, thereby enabling to illuminate the light-emitting member (93) in the NFC module (91) so as to be utilized as light.

And, the user may change any make-up palettes separately, or replace the whole with preferred arrangements.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

| [Explanations of numeral reference] | |
|---|---|
| 1: mobile phone case | 10: main body |
| 20: palettes storage recess | 30: make-up palettes |
| 40: cover | 50: supplementary palettes storage recess |
| 60: supplementary make-up palettes | 90: mirror |
| 91: NFC module | 93: light-emitting member |

The invention claimed is:

1. A mobile phone case having make-up palettes capable of being separated and combined, comprising:
   a palettes storage recess having a rectangular shape and disposed in a rear surface of a main body;
   make-up palettes each having a square or rectangular shape and arranged in the palettes storage recess; and
   a cover having a plate shape whose size is the same as the main body and being axially combined for rotation at one side of the rear surface of the main body,
   wherein the mobile phone case is provided, on a front edge of the main body, with a raised spot for storing a mobile phone,
   wherein the palettes storage recess comprises an opening, a first sliding protrusion disposed on a left or right side edge thereof, and a first sliding recess disposed on the right or left side edge thereof,
   wherein the make-up palettes comprise a second sliding recess disposed on one side so as to connect the first sliding protrusion of the palettes storage recess or the neighboring make-up palettes, and a second sliding protrusion disposed on another so as to connect the second sliding recess of the palettes storage recess or the neighboring make-up palettes, and
   wherein the palettes storage recess includes a fixing bar which is combined to a hinge so at to make one end rotate for injecting and fixing the make-up palettes to the opening.

2. The mobile phone case according to claim 1, wherein the mobile phone case is equipped with one or more of supplementary palettes storage recesses at both sides of the palettes storage recess based on a size of the mobile phone and stores supplementary make-up palettes to the supplementary palettes storage recesses.

3. The mobile phone case according to claim 2, wherein the palettes storage recess or the supplementary palettes storage recess forms a first magnetic plate at an inner bottom thereof, and the make-up palettes or the supplementary make-up palettes form a second magnetic plate, thereby being attached to the palettes storage recess or the supplementary palettes storage recess.

4. The mobile phone case according to claim 2, wherein the palettes storage recess or the supplementary palettes storage recess forms one or more of first clamping recesses at an inner bottom thereof, and fastening protrusions projecting out over the make-up palettes or the supplementary make-up palettes so as to be coupled to the first clamping recesses in the palettes storage recess or the supplementary palettes storage recess.

5. The mobile phone case according to claim 1, wherein the cover includes a mirror recess disposed at an inner side thereof for a mirror.

6. The mobile phone case according to claim 5, wherein the mirror sticks to an NFC (Near Field Communication) module on the rear surface; and a light-emitting member which is illuminated by frequency of the NFC module on a rear surface edge while making the edge transparent.

7. The mobile phone case according to claim 6, wherein the NFC module is operated by an application installed to the mobile phone.

8. The mobile phone case according to claim 1, wherein the cover installs a first fixing magnet at one side of a bottom thereof; and a second fixing magnet is installed to a position corresponding to the first fixing magnet of the cover on the rear surface of the main body, thereby fixing the cover to the main body.

9. The mobile phone case according to claim 1, wherein a second fastening protrusion projects out over one side of a bottom of the cover; and a second clamping recess is installed to a position corresponding to the second fastening protrusion of the cover on the rear surface of the main body, thereby fixing the cover to the main body throughout integral combination.

* * * * *